United States Patent [19]

Pitassi

[11] Patent Number: 5,673,347
[45] Date of Patent: Sep. 30, 1997

[54] METHOD FOR BUTT-COUPLING OPTICAL FIBRE CONNECTORS COMPRISING A CYLINDRICAL FERRULE

[75] Inventor: Stefano Pitassi, Udine, Italy

[73] Assignee: Sirti S.p.A., Milan, Italy

[21] Appl. No.: 626,974

[22] Filed: Apr. 3, 1996

[30] Foreign Application Priority Data

May 9, 1995 [IT] Italy ................... MI95/A0921

[51] Int. Cl.$^6$ ................................................. G02B 6/38
[52] U.S. Cl. ........................ 385/70; 385/85; 385/80
[58] Field of Search ........................ 385/70, 88–94, 385/85, 84, 77, 80

[56] References Cited

U.S. PATENT DOCUMENTS

| 5,193,133 | 3/1993 | Schofield et al. | 385/85 |
| 5,432,880 | 7/1995 | Diner | 385/85 |

FOREIGN PATENT DOCUMENTS

| 0095281 | 11/1983 | European Pat. Off. . |
| 0223609 | 5/1987 | European Pat. Off. . |
| 0298144 | 1/1989 | European Pat. Off. . |
| 0621107 | 10/1994 | European Pat. Off. . |
| 2176906 | 1/1987 | United Kingdom . |

Primary Examiner—Phan T. H. Palmer
Attorney, Agent, or Firm—Hedman, Gibson & Costigan, P.C.

[57] ABSTRACT

The method for butt-coupling an optical fibre connector comprising a cylindrical ferrule consists of the following steps:

a) preparing the head of the optical fibre for insertion into the ferrule;

b) applying a thin layer of resin to the fibre, taking care not to soil the cut end of the fibre with said resin;

c) inserting said fibre into the sized hole of the cylindrical ferrule;

d) by means of an alignment bush, coupling said ferrule to a reference ferrule in which a piece of fibre has been previously housed and fixed such that the end surface of said fibre lies inward of the end surface of the reference ferrule;

e) crosslinking the resin.

5 Claims, 1 Drawing Sheet

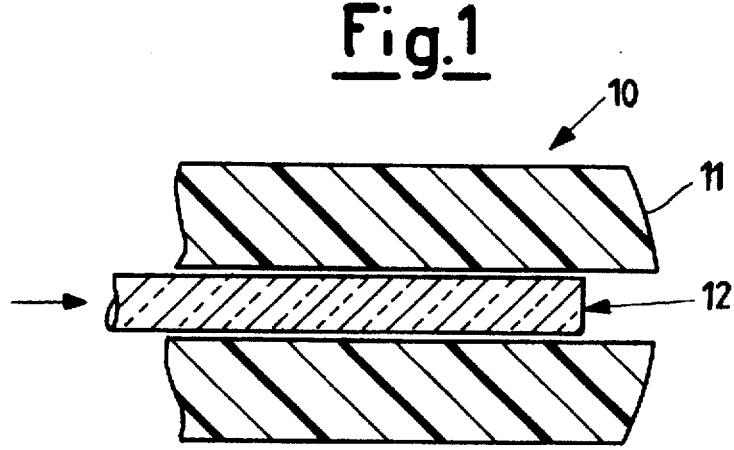
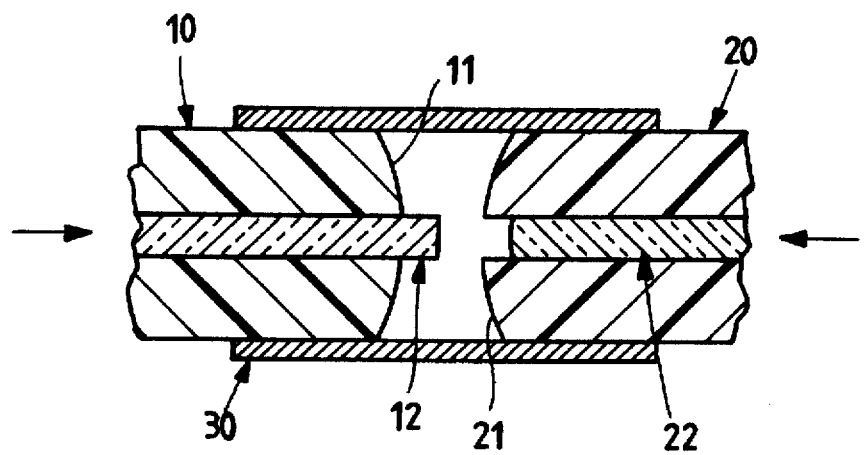
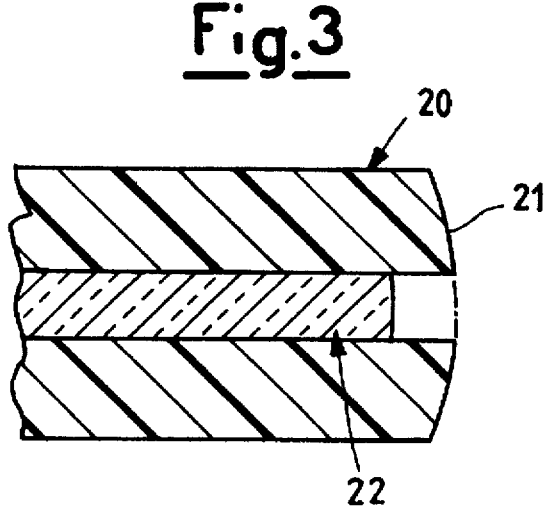

METHOD FOR BUTT-COUPLING OPTICAL FIBRE CONNECTORS COMPRISING A CYLINDRICAL FERRULE

FIELD OF THE INVENTION

This invention relates to a new method for butt-coupling optical fibre connectors comprising a cylindrical ferrule.

BACKGROUND OF THE INVENTION

In preparing a connector comprising a cylindrical ferrule, a vital operation for its reliability and adequate optical performance (insertion and return losses) is the polishing of the end surface of the ferrule and in particular of the fibre glued into it.

Typically, in the current state of the art, the following briefly described procedure is used.

The previously prepared optical fibre is inserted into the cylindrical ferrule so that a certain length of it projects beyond the ferrule surface. Resin is applied about the projecting portion of optical fibre to ensure that the fibre is also perfectly secured to the ferrule at its end. It is essential to ensure that part of the resin infiltrates between the fibre and the sized hole in the cylindrical ferrule.

To ensure proper operation of the connector the projecting fibre portion is then cut off as far as the base of the resin. The entire end surface of the ferrule, the fibre and the overlying portion of resin are subjected to lapping to obtain a convex surface free from roughness. To further increase the quality of the connector the surface, and in particular of the fibre, must be finely polished.

The lapping and polishing are effected by an abrasive process using suitable fine grain papers (from a few microns to fractions of a micron) and colloidal solutions. Overall, the procedure is onerous in terms of time and resources employed because the simultaneous presence of three different types of material (fibre, resin and the material of the cylindrical ferrule) means that these tend to be abraded differently such that if the entire process is not controlled, a damaging shrinkage of the end surface of the fibre relative to that of the cylindrical ferrule occurs. An object of the present invention is to define a method for butt-coupling connectors comprising a cylindrical ferrule which eliminates or at least reduces said drawbacks of the known art. A further object of the present invention is to achieve a method which is simpler, cheaper, involves less time and provides a superior optical performance, in particular in terms of return losses.

SUMMARY OF THE INVENTION

The present invention provides a method for butt-coupling an optical fibre connector comprising a cylindrical ferrule, consisting of the following steps:

a) preparing the head of the optical fibre by removing its cladding and then cutting the end to be inserted into the hole in the cylindrical ferrule;

b) applying a thin layer of resin to the fibre, taking care not to soil the cut end of the fibre with said resin;

c) inserting said fibre into the sized hole of the cylindrical ferrule, the end surface of which has been previously lapped in a convex manner;

d) by means of an alignment bush, coupling said ferrule to a reference ferrule the end surface of which is convex, and in which a piece of fibre has been previously housed and fixed such that the end surface of said fibre lies inward of the end surface of the reference ferrule;

e) crosslinking the resin by heating.

In alternative embodiments of the present invention, said crosslinking may take place at ambient temperature if the type of resin allows it.

The end surface of the fibre inserted into the hole in the ferrule may then be further polished if it is desired to make this surface convex as that of the ferrule, by using an abrasive paper of very fine grain (less than one micron). In view of the characteristics of the proposed method, said polishing is not critical for the connector and can even be done manually.

Alternatively, or after this latter polishing operation, the ferrule can be assembled with all the constituent parts of the connector.

Further characteristics and details of the method of the present invention will be more apparent from the description given hereinafter by way of non-limiting example with reference to the accompanying drawings, in which:

BRIEF DESCRIPTION OF THE DRAWING

FIG. 1 shows the insertion of the optical fibre into the sized hole of the cylindrical ferrule to be butt-coupled;

FIG. 2 shows the connection between the ferrule to be butt-coupled and the reference ferrule, by means of an alignment bush 30;

FIG. 3 is a section through the end part of a reference ferrule.

DETAILED DESCRIPTION OF THE INVENTION

In FIG. 1 the reference numeral 10 indicates a ferrule to be butt-coupled. It has a convex end surface 11, with the cut fibre 12 inserted to the extent of projecting from said ferrule 10. FIG. 2 shows the connection between the ferrule 10 to be butt-coupled and a reference ferrule 20, the structure of which is more evident from FIG. 3. In the reference ferrule 20, which also has a convex end surface 21, the optical fibre portion 22 lies inwards of the end surface 21. In the coupling arrangement shown in FIG. 2, this withdrawal of the optical fibre 22 from the surface 21 determines the corresponding projection of the optical fibre portion 12 from the ferrule 10 to be butt-coupled.

It is hence apparent that the aforedescribed method is applicable to all optical fibre connectors using cylindrical ferrules with a sized hole, whatever the constituent material of the ferrule or the type of resin used for gluing the fibre. The only conditions which have necessarily to be respected are the following:

1. After the fibre has been positioned in the ferrule hole, it must be ensured that the resin is perfectly crosslinked (hardened).

2. It must be ensured that the fibre portion in the vicinity of the end surface of the ferrule has not been glued to the ferrule hole.

To avoid the step involving the further polishing of the fibre end surface, the fibre must be cut, under point a), perpendicular to its longitudinal axis.

Finally it is essential that in the reference ferrule the fibre lies inward of (withdrawn from) the end surface of the ferrule, so that during the coupling to the other ferrule the butt-coupled fibre is able to protrude.

I claim:

1. A method for butt-coupling optical fibre connectors comprising a cylindrical ferrule, consisting of the following steps:

a) preparing the head of the optical fibre and cutting its end for insertion into the hole in the cylindrical ferrule;

b) applying a thin layer of resin to the fibre, taking care not to soil the cut end of the fibre with said resin;

c) inserting said fibre into the sized hole of the cylindrical ferrule, the end surface of which has been previously lapped in a convex manner;

d) by means of an alignment bush, coupling said ferrule to a reference ferrule the end surface of which is convex, and in which a piece of fibre has been previously housed and fixed such that the end surface of said fibre lies inward of the end surface of the reference ferrule;

e) crosslinking the resin by heating.

2. A method as claimed in claim 1, characterised in that said crosslinking takes place at ambient temperature.

3. A method as claimed in claim 1 or 2, characterised in that following the operation under point e), the fibre inserted into the ferrule is further polished at its end.

4. A method as claimed in claim 1 or 2, characterised in that the cut surface of the fibre inserted into the ferrule is perpendicular to the longitudinal axis of the fibre.

5. A method as claimed in claim 1, characterised in that the ferrule is assembled together with all the constituent parts of the connector.

* * * * *